United States Patent
Cook

(10) Patent No.: US 9,556,347 B1
(45) Date of Patent: Jan. 31, 2017

(54) METHOD OF AQUEOUS INKJET INK PRINTING

(71) Applicant: Eastman Kodak Company, Rochester, NY (US)

(72) Inventor: Wayne Lee Cook, Xenia, OH (US)

(73) Assignee: EASTMAN KODAK COMPANY, Rochester, NY (US)

(*) Notice: Subject to any disclaimer, the term of this patent is extended or adjusted under 35 U.S.C. 154(b) by 0 days.

(21) Appl. No.: 15/088,181

(22) Filed: Apr. 1, 2016

(51) Int. Cl.
| | |
|---|---|
| *B41J 2/02* | (2006.01) |
| *C09D 11/107* | (2014.01) |
| *C09D 11/328* | (2014.01) |
| *C09D 11/033* | (2014.01) |
| *B41J 2/04* | (2006.01) |

(52) U.S. Cl.
CPC ............ *C09D 11/107* (2013.01); *B41J 2/02* (2013.01); *B41J 2/04* (2013.01); *C09D 11/033* (2013.01); *C09D 11/328* (2013.01)

(58) Field of Classification Search
CPC ............ B41J 2/02; B41J 2/07; B41J 2/2107; B41J 2/01; B41J 2/211; B41J 2/2114; B41J 2/2117; B41J 2/5052; B41J 2/04; B41M 1/18; B41M 1/20; B41M 1/22; B41M 1/24; B41M 1/26; B41M 5/5218; C09B 67/0041; C09B 69/001; C09B 69/101; C09B 69/102; C09B 69/103; C09B 69/104; C09B 69/105; C09B 69/106; C09B 69/107; C09B 69/108; C09C 1/0036; C09C 1/0063; C09C 2200/308; C09D 11/037; C09D 11/322; C09D 11/326; C09D 11/40; C09D 17/004; C09D 5/082; C09D 11/107; C09D 11/033; C09D 11/328
See application file for complete search history.

(56) References Cited

U.S. PATENT DOCUMENTS

| | | | |
|---|---|---|---|
| 6,124,376 A | 9/2000 | Nichols et al. | |
| 6,451,098 B1 | 9/2002 | Lye et al. | |
| 6,596,066 B2 | 7/2003 | Lye et al. | |
| 6,846,851 B2 | 1/2005 | Nakhmanovich et al. | |
| 7,435,765 B2 | 10/2008 | McCovick et al. | |
| 8,118,419 B2 * | 2/2012 | Morohoshi | B41M 5/5218 347/100 |
| 8,142,558 B2 | 3/2012 | Robertson et al. | |
| 8,414,695 B2 | 4/2013 | Robertson et al. | |
| 8,460,450 B2 | 6/2013 | Taverizatshy et al. | |
| 2012/0105548 A1 * | 5/2012 | Irving | C09D 11/322 347/73 |
| 2012/0105553 A1 * | 5/2012 | Sowinski | C09D 11/326 347/73 |
| 2014/0231674 A1 | 8/2014 | Cook | |
| 2014/0295152 A1 | 10/2014 | Brust et al. | |

FOREIGN PATENT DOCUMENTS

EP  1 142 967 A  10/2001

* cited by examiner

*Primary Examiner* — Kristal Feggins
(74) *Attorney, Agent, or Firm* — J. Lanny Tucker

(57) ABSTRACT

A method is useful for providing an ink jetted image with improved print optical density. The method includes use of an aqueous particle-free inkjet ink composition that consists essentially of: aqueous particle-free inkjet ink composition has a pH of 7 to 9, and consists essentially of: (A) a water-soluble dye colorant at 2-10 weight %, (B) a water-soluble polymer at 1-4 weight %, and an aqueous medium consisting essentially of water. The water-soluble polymer has an acid number or at least 130 and a molecular weight of 5,000-20,000. It comprises: (a) 55-80 mol % of recurring units derived from one or more ethylenically unsaturated polymerizable monomers selected from the group consisting of substituted or unsubstituted styrenes, (meth)acrylates, and combinations thereof, each (meth)acrylate comprising either a pendant phenyl group or an alkyl ester group having 12-20 carbon atoms; and (b) 20-35 mol % of recurring units comprising (meth)acrylic acid.

13 Claims, No Drawings

METHOD OF AQUEOUS INKJET INK PRINTING

RELATED APPLICATION

Copending and commonly assigned Ser. No. 15/088,205 entitled "Aqueous Particle-free Inkjet Ink Composition" filed on Apr. 1, 2016, by Wayne Cook.

FIELD OF THE INVENTION

This invention relates to a method for using an aqueous particle-free inkjet ink composition to provide images that exhibit improved optical print density. The aqueous particle-free inkjet ink composition consists essentially of an aqueous medium, a water-soluble dye colorant, and a water-soluble polymer having a unique combination of recurring units, acid number, and molecular weight.

BACKGROUND OF THE INVENTION

Ink jet printing is a non-impact method for producing printed images by the deposition of ink drops in a pixel-by-pixel manner onto an image-recording receiver element in response to digital signals. For example, inkjet printing can be used for printing a colored image onto a receiver element using a stream of ink droplets directed from an inkjet printing device.

There are various methods that can be used to control the deposition of ink drops on a receiver element (substrate) to yield the desired inkjet printed image. Inkjet printing systems are generally of two types: drop-on-demand (DOD) printing systems and continuous ink jet (CIJ) printing systems. For CIJ printing systems, the direction of the stream of ink droplets is controlled electronically and causes the ink droplets to print the desired image or information on the receiver element without requiring contact between the printing device and the surface to which the ink is applied. Inkjet printers have found broad applications across markets ranging from desktop document and photographic-quality, to short run printing and industrial labeling. Objects comprising substrates to which inkjet printing is well suited include but are not limited to, containers for consumer products, currency, draft checks, envelopes, letterhead, identification cards, lottery tickets, bank cards, identification strips, labels, brochures, signage, and other well-known materials.

Drop-on-demand printing systems are widely used in home or consumer ink jet printers and slower consumer printers, both of which have been available for several decades. As the name implies, this type of inkjet printing uses a print head that ejects droplets of ink only when signaled to do so by a digital controller.

CIJ printing systems generally comprise two main components, a fluid system (including an ink reservoir) and one or more print heads. Ink can be pumped through a supply line from the ink reservoir to a manifold that distributes the ink to a plurality of orifices, typically arranged in linear array(s), under sufficient pressure to cause ink streams to issue from the orifices of the print head(s). Stimulations can be applied to the print head(s) to cause those ink streams to form streams of uniformly sized and spaced drop, which are deflected in a suitable manner, into printing or non-printing paths. Non-printing drops can be returned to the ink reservoir using a drop catcher and a return line. Thus, in contrast to DOD printing systems, CIJ printing systems involves use of a continuous stream of ink drops that are separated to discriminate between printing drops and non-printing drops. This discrimination can be accomplished in various ways known in the art. Some useful CIJ printing apparatus and print head fabrication are described for example in U.S. Pat. No. 6,588,888 (Jeanmaire et al.) and U.S. Pat. No. 6,943,037 (Anagnostopoulos et al.).

Commercially available CIJ inks are commonly aqueous dye-based inks that exhibit a number of problems. In such dye-based inks, no particles are observable under the microscope. Although there have been many recent advances in the art of dye-based ink jet inks, such inks still suffer from deficiencies such as low optical densities on coated glossy paper and poor light-fastness. When water is used as the carrier, such aqueous inks also generally suffer from poor water fastness, poor smear resistance, and uncontrolled gloss.

Most aqueous ink jet ink compositions contain non-polymeric water-miscible compounds known as "humectants" to prevent the ink jet inks from drying out in ink jet nozzles during ink jetting. Such drying out can lead to ink droplet mis-direction and printed image defects. For most aqueous ink jet ink compositions, such humectants are generally non-polymeric, nonionic hydrophilic polyols such as glycols, glycol ethers and other compounds with one or more hydroxy groups. Representative humectants are described for this purpose, for example, in U.S. Patent Application Publications 2014/0231674 (Cook) and 2014/0295152 (Brust et al.) and U.S. Pat. No. 8,142,558 (Robertson et al.). Silicon-containing polymers can be included in aqueous ink jet ink compositions to reduce wet-smear according to U.S. Pat. No. 6,124,376 (Nichols et al.). In addition, UV-curable humectants are described in U.S. Pat. No. 6,846,851 (Nakhmanovich et al.).

It has been observed that images on various papers provided using aqueous-based inkjet ink formulations containing water-soluble dyes typically exhibit lower print optical density compared to similar images prepared using offset lithographic, flexographic, or gravure printing. This is due in part to the penetration of the aqueous-based inkjet ink into the paper substrate. This problem can be more prominent using CIJ printing inks which generally have lower viscosities than printing inks used in DOD printing systems.

Thus, there is a need for aqueous particle-free inkjet ink compositions and methods for using them to provide durable and dye image-stable images having improved print optical density on various types of receiver elements (substrates).

SUMMARY OF THE INVENTION

The present invention provides a method of providing an ink jetted image with improved print optical density, which method comprises:

ink jetting an aqueous particle-free inkjet ink composition onto a receiver element from a main fluid supply containing the aqueous particle-free inkjet ink composition, wherein the aqueous particle-free inkjet ink composition consists essentially of:

(A) a water-soluble dye colorant present in an amount of at least 2 weight %, based on the total weight of the aqueous particle-free inkjet ink composition, (B) a water-soluble polymer present in an amount of at least 1 weight %, based on the total weight of the aqueous particle-free inkjet ink composition, and (C) an aqueous medium consisting essentially of water, and wherein the water-soluble polymer has an acid number of at least 130 and a molecular weight of at least 5,000 and up to and including 20,000, and comprises: (a) at least 50 mol % and up to and including 85 mol % of recurring units derived from one or more ethylenically unsaturated polymerizable monomers selected from the group consisting of substituted or unsubstituted styrenes, (meth)acrylates, and combinations thereof, each (meth)acrylate comprising either a pendant phenyl group or an alkyl ester group having 10 to 20 carbon atoms; and (b) at least 15 mol % and up to and including 40 mol % of recurring units comprising a carboxylic acid group, all recurring unit amounts being based on the total recurring units in the water-soluble polymer.

The aqueous particle-free inkjet ink compositions described herein for this invention contain water-soluble dye colorants that generally require no dispersant in aqueous media. However, in the absence of conventional humectants, the aqueous particle-free inkjet ink composition described herein provides images on various substrates that exhibit improved print optical density. It was also observed that the aqueous particle-free inkjet ink compositions do not readily dry out in inkjet nozzles.

These advantages are provided by the presence of the water-soluble polymers described herein having a unique combination of compositional recurring units, acid number, and molecular weight. Such water-soluble polymers can be used in place of the conventional humectants (especially those containing hydroxy groups) yet they appear to keep the water-soluble colorant (dye) "solubilized" so that the ink does not dry out in the inkjet printing nozzles.

It was unexpectedly found that the printed images obtained using the present invention exhibit improved print optical density as determined using a reflection spectrophotometer as described in more detail below. In particular, when using the aqueous particle-free inkjet ink compositions described herein, the resulting images have a print optical density that is at least 10%, or at least 15%, or even at least 20%, greater than the print optical density achieved under the same circumstances (for example, conditions including the same substrate) using a "comparative" composition that has the same composition as the inventive composition but from which the inventive water-soluble polymers have been omitted.

DETAILED DESCRIPTION OF THE INVENTION

The following discussion is directed to various embodiments of the present invention and while some embodiments can be desirable for specific uses, for example providing inkjet printed images, the disclosed embodiments should not be interpreted or otherwise considered be limit the scope of the present invention, as claimed below. In addition, one skilled in the art will understand that the following disclosure has broader application than is explicitly described and the discussion of any embodiment.

DEFINITIONS

As used herein to define various components of the aqueous particle-free inkjet ink compositions including the water-soluble polymers and water-soluble dye colorant unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "aqueous particle-free inkjet ink composition," "inkjet ink composition," and "inventive ink" are meant to refer to embodiments according to the present invention.

As used herein, the parameter "acid number" (also known as acid value) is defined as the milligrams (mg) of potassium hydroxide required to neutralize 1 g of the acidic polymer described herein.

The term "particle-free" refers to aqueous inkjet ink compositions described herein that contain substantially no organic or inorganic particles such as pigment colorants, colorless inorganic fillers, or polymeric particles. More particularly, such particles are completely absent from such compositions, or at the most, they are present in an amount of less than 0.01 weight %, based on the total weight of the aqueous particle-free inkjet ink composition.

Unless otherwise noted herein, print optical density of an image (ink jetted or otherwise applied to a substrate) was measured using a reflectance spectrophotometer in Status T mode using the instructions that are provided with the specific instrument used for the evaluation. For example, such evaluations can be carried out using an X-Rite eXact® reflectance spectrophotometer in the Status T mode and operational conditions defined for that instrument.

Molecular weight for the water-soluble polymers described herein refers to weight average molecular weight ($M_w$) that can be determined using Size Exclusion (or Gel Permeation) Chromatography calibrated with polystyrene standards, providing polystyrene equivalent molecular weight.

In reference to the water-soluble polymers and water-soluble dye colorants used in the present invention, the term "water-soluble" refers to organic compounds that can be dissolved in water to form a homogeneous composition such that there is no observable settling in water after 24 hours at room temperature.

Aqueous Particle-Free InkJet Ink Compositions

The aqueous particle-free inkjet ink compositions described for the present invention have only a three essential components to provide the desired performance and properties in the resulting printed images. Thus, each aqueous particle-free inkjet ink composition consists essentially of: (A) one or more water-soluble dye colorants (described below); (B) one or more water-soluble polymers (described below); and (C) an aqueous medium consisting essentially of water. There are no components other than (A), (B), and (C) that are necessary for the usefulness and desired properties of the aqueous particle-free inkjet ink compositions.

Each aqueous particle-free inkjet ink composition generally has a suitable viscosity for use in an inkjet printing machine and especially for CIJ ink jet printing processes and equipment. At 25° C., the viscosity of each aqueous particle-free inkjet ink composition is generally less than 10 centipoise or more likely from 1 centipoise and up to and including 5 centipoise, or even at least 1 centipoise and up to and including 3 centipoise. Viscosity can be measured using a standard viscometer under standard conditions.

The pH of each aqueous particle-free inkjet ink composition is generally at least 7 and up to and including 11 or more likely at least 7 and up to and including 9, or still more likely of at least 7.5 and up to and including 8.5. The pH can be obtained and adjusted by use of suitable acids and bases as is known in the art, for example see [0083] of U.S Patent Application Publication 2014/0231674 (Cook), the disclosure of which is incorporated herein by reference. Measurement of pH can be carried out using standard equipment and procedures.

(A) Water-Soluble Dye Colorants:

The dye colorants used in the present invention are water-soluble as defined above.

Useful water-soluble dye colorants of this type can be chosen to provide any desired color or hue. They can be used singly or in mixtures to provide a desired color or hue that can be black, cyan, magenta, yellow, green, brown, orange, pink, blue, red, or violet, or any hue that is not generally classified as one of those colors. Such compounds can be anionic dyes, cationic dyes, nonionic dyes, or zwitterionic dyes.

Organic compounds that can be used as water-soluble dye colorants include but are not limited to, Food Black 1, Food Black 2, Food Black 40, Carta Black, Direct Black dyes (4, 14, 17, 22, 27, 38, 51, 112, 117, 154, and 168), carboxylated Food Black 286, Acid Black dyes (1, 7, 9, 24, 26, 48, 52, 58, 60, 61, 63, 92, 107, 109, 118, 119, 131, 140, 155, 156, 172, and 194), Acid Red dyes (1, 8, 32, 35, 37, 52, 57, 92, 115, 119, 154, 249, 254, and 256), Food Red 40, Direct Red dyes (1, 2, 16, 23, 24, 28, 39, 62, 72, 227, and 236), Direct Red 227, Food Yellow 7, Acid Yellow dyes (3, 7, 17, 19, 23, 25, 29, 38, 42, 49, 59, 61, 72. 73, 114, 128, and 151), Direct Yellow dyes (4, 11, 12, 27, 28, 33, 34, 39, 50, 58, 86, 100, 106, 107, 118, 127, 132, 142, and 157), Food Blue 1, Acid Blue dyes (1, 7, 9, 25, 40, 45, 62, 78, 80, 92, 102, 104, 113, 117, 127, 158, 175, 183, 185, 193, and 209), Direct Blue dyes (1, 6, 8, 14, 15, 25, 71, 76, 78, 80, 86, 90, 106, 108, 123, 163, 165, 199, and 226), Direct Blue 199, FD&C Blue 1, Acid Orange 7, and others that are known in the art and available from various commercial sources, including those listed in Col. 9 (line 8) to Col. 10 (line 5) of U.S. Pat. No. 6,124,376 (Nichols et al.) the disclosure of which is incorporated herein by reference and in Col. 2 (line 65) to Col. 3 (line 23) which disclosure is also incorporated herein by reference. Any anionic dyes can be supplied with suitable counterion(s) such as sodium, lithium, quaternary ammonium, or triethanol amine counterions.

The particularly useful water-soluble dye colorants are Direct Black dyes, Acid Black dyes, a mixture of two or more Direct Black dyes, a mixture of two or more Acid Black dyes, or a mixture of at least one Direct Black dye and at least one Acid Black dye. Specific examples of useful water-soluble black colorants are described in the Examples below.

The one or more water-soluble dye colorants are generally present in the aqueous particle-free inkjet ink composition in an amount of at least 2 weight % and up to and including 10 weight %, or at least 4 weight % and up to and including 8 weight %, all based on the total weight of the aqueous particle-free inkjet ink composition (including the aqueous medium).

(B) Water-Soluble Polymers:

One or more water-soluble polymers are present in the aqueous particle-free inkjet ink compositions. Each of such water-soluble polymers has an acid number of at least 130 and more likely at least 130 and up to and including 240, or even at least 140 and up to and including 220.

In addition, each of such water-soluble polymers has a molecular weight ($M_w$) of at least 5,000 or more likely at least 5,000 and up to and including 20,000, or even at least 5,000 and up to and including 15,000, or typically at least 6,500 and up to and including 12,000.

Each of the water-soluble polymers used in this invention comprises: (a) at least 50 mol % and up to and including 85 mol % of recurring units derived from one or more ethylenically unsaturated polymerizable monomers selected from the group consisting of substituted or unsubstituted styrenes, (meth)acrylates, and combinations thereof, each (meth)acrylate comprising either a pendant phenyl group or an alkyl ester group having 10 to 20 carbon atoms; and (b) at least 15 mol % and up to and including 40 mol % of recurring units comprising a carboxylic acid group, all recurring unit amounts being based on the total recurring units in the water-soluble polymer.

In some embodiments, each of such water-soluble polymers comprises: (a) at least 55 mol % and up to and including 80 mol % of recurring units derived from one or more ethylenically unsaturated polymerizable monomers selected from the group consisting of substituted or unsubstituted styrenes, (meth)acrylates, and combinations thereof, each (meth)acrylate comprising either a pendant phenyl group or an alkyl ester group having 12 to 18 carbon atoms; and (b) at least 20 mol % and up to and including 35 mol % of recurring units comprising a carboxylic acid group, all recurring unit amounts being based on the total recurring units in the water-soluble polymer.

In more specific embodiments, each of the water-soluble polymers comprises: (a) at least 55 mol % and up to and including 80 mol % of recurring units derived from one or more ethylenically unsaturated polymerizable monomers selected from benzyl (meth)acrylates, a substituted or unsubstituted styrene, and a combination thereof; and (b) at least 20 mol % and up to and including 35 mol % of recurring units derived from (meth)acrylic acid, all recurring unit amounts being based on the total recurring units in the water-soluble polymer.

The (a) recurring units described above can be derived from one or more ethylenically unsaturated polymerizable monomers selected from substituted or unsubstituted styrenes such as styrene, α-methyl styrene, p-bromostyrene, o- or m-chlorostyrene or mixtures thereof, dimethoxystyrenes, p-aminostyrene, t-butylstyrene, 4-trimethyleneidoxystyrene, and other "monomers" of this type that would be readily apparent to one skilled in the art. Substituted or unsubstituted styrene is particularly useful for providing such (a) recurring units and unsubstituted styrene is more useful.

The (a) recurring units can be also have pendant alkyl ester groups and be provided from one or more (meth)acrylates each of which comprises either a pendant substituted or unsubstituted phenyl group or an alkyl ester group having 10 to 20 carbon atoms (or likely at least 12 to 18 carbon atoms). For example, such (a) recurring units can be provided from benzyl methacrylate, stearyl methacrylate, lauryl methacrylate, stearyl acrylate, lauryl acrylate, benzyl acrylate, 4-methyl benzyl methacrylate, palmityl acrylate, palmityl methacrylate, and other "monomers" of this type that would be readily apparent to one skilled in the art. Benzyl methacrylate, stearyl methacrylate, and lauryl methacrylate are particularly useful.

The (a) recurring units can be present in an amount of at least 50 mol %, or typically of at least 50 mol % and up to and including 85 mol %, or at least 55 mol % and up to and including 80 mol %, or even at least 55 mol 5 and up to and including 75 mol %, all recurring units amounts being based on the total recurring units in the water-soluble polymer.

The (b) recurring units comprising one or more carboxylic acid groups described above can be derived from acrylic acid, methacrylic acid, crotonic acid, tiglic acid, 4-vinylbenzoic acid, maleic acid, fumaric acid, citaconic acid, methylmaleic acid, and other "monomers" with carboxylic acid groups that would be readily apparent to one skilled in the art, as well as precursor ethylenically unsaturated polymerizable monomers such as corresponding anhydrides or halides.

The (b) recurring units can be present in an amount of at least 15 mol %, or typically of at least 15 mol % and up to and including 40 mol %, or at least 20 mol % and up to and including 35 mol %, all recurring units amounts being based on the total recurring units in the water-soluble polymer.

The water-soluble polymers for this invention can further comprise additional recurring units besides those (a) and (b) recurring units identified herein, which additional recurring units can be present in an amount of up to and including 35 mol % or up to and including 20 mol %, based on the total recurring units in the water-soluble polymer. In some embodiments, there are no additional recurring units in the water-soluble polymers. Some particularly useful additional recurring units can be derived from one or more of ethoxyethoxyethyl acrylate, ethoxyethoxyethyl methacrylate, and other "monomers" that are not defined above for making the (a) and (b) recurring units, which could be readily determined by one skilled in the art using routine experimentation.

The water-soluble polymers useful herein can be used with free carboxylic acid groups, but in many embodiments, up to 100% of the carboxylic acid groups are neutralized with a suitable cation such as potassium, sodium or other alkali metal cations provided as part of suitable salts or bases, or with an amine such as dimethylethanol amine, methyldiethanolamine, or similar compounds that would be readily apparent to one skilled in the art.

Particularly useful water-soluble polymers include but are not limited to the following materials (weight ratios refer to relative amounts of ethylenically unsaturated polymerizable monomers incorporated into the reaction mixtures used to prepare the polymers):

Polymer 1: poly(benzyl methacrylate-co-stearyl methacrylate-co-methacrylic acid) (35:30:35 weight ratio), neutralized with potassium hydroxide, for example having an acid number of 215 before neutralization and a $M_w$ of 9,000;

Polymer 2: poly(benzyl methacrylate-co-stearyl methacrylate-co-methacrylic acid) (35:30:35 weight ratio), neutralized with dimethylethanolamine, for example having an acid number of 215 before neutralization and a $M_w$ of 9,000;

Polymer 3: poly(styrene-co-a-methyl styrene-co-acrylic acid-co-ethoxyethoxyethyl acrylate) (52:7:29:12 weight ratio), neutralized with potassium hydroxide (commercially available as Joncryl® HPD-696 polymer from BASF), for example, having an acid number of 220 before neutralization and a $M_w$ of 16,000;

Polymer 4: poly(styrene-co-methacrylic acid) (64:36 weight ratio), neutralized with dimethylethanolamine, for example having an acid number of 234 before neutralization and a $M_w$ of 21,700;

Polymer 5: poly(lauryl methacrylate-co-methacrylic acid) (67:33 weight ratio), neutralized with dimethylethanolamine, for example having an acid number of 215 and a $M_w$ of 10,800;

Polymer 6: poly(benzyl methacrylate-co-methacrylic acid) (67:33 weight ratio), neutralized with potassium hydroxide, for example having an acid number of 215 and a $M_w$ of 8,000;

Polymer 7: poly(benzyl methacrylate-co-stearyl methacrylate-co-methacrylic acid) (63.5:15:21.5 weight ratio), neutralized with potassium hydroxide, for example, having an acid number of 140 and a $M_w$ of 8,000;

Polymer 8: poly(benzyl methacrylate-co-styrene-co-methacrylic acid) (30:45:25 weight ratio), neutralized with dimethylethanol amine, for example having an acid number of 163 and a $M_w$ of 10,100; and Polymer 9: poly(benzyl methacrylate-co-methacrylic acid) (77:23 weight ratio), neutralized with potassium hydroxide, for example having an acid number of 150 and an $M_w$ of 7,000.

The mol % numbers provided above for the various (a), (b) and (c) recurring units can refer to either actual molar amounts determined from analysis or theoretical molar amounts determined from the molar ratios of the various ethylenically unsaturated polymerizable monomers used in preparing the water-soluble polymers. In most embodiments, the actual and theoretical mol % amounts differ by less than 15%. The weight % of various useful ethylenically unsaturated polymerizable monomers used in reaction mixtures to prepare the water-soluble polymers can be calculated in order to achieve the desired mol % of recurring units.

The water-soluble polymers useful for the present invention can be prepared using known polymerization starting materials (ethylenically unsaturated polymerizable monomers), organic solvents (for example, methyl ethyl ketone or Dowanol® PM commercial solvent), photoinitiators, chain transfer agents (for example, dodecanethiol), and conditions for solution polymerization. Alternatively, some water-soluble polymers can be obtained from various commercial sources. After formation of the water-soluble polymer, it can be neutralized with a suitable base as noted above, and the reaction solution can be diluted with water. The organic reaction solvent can be removed in a suitable manner to isolate the water-soluble polymer.

The total amount of the one or more water-soluble polymers in the aqueous particle-free inkjet ink composition is at least 1 weight % or likely at least 1 weight % and up to and including 4 weight %, based on the total weight of the aqueous particle-free inkjet ink composition. More specifically, the total amount of such polymers can be at least 1.5 weight % and up to and including 3 weight %, based on the total weight of the aqueous particle-free inkjet ink composition.

In some embodiments, the aqueous particle-free inkjet ink composition comprises a water-soluble polymer in an amount of at least 1.5 weight % and up to and including 3 weight %, and a water-soluble dye colorant in an amount of at least 4 weight % and up to and including 8 weight %, all amounts being based on the total weight of the aqueous particle-free inkjet ink composition.

(C) Aqueous Medium:

The last essential component is an aqueous medium that consists essentially of water, meaning that water is at least 90 weight %, or at least 95 weight %, or even 100 weight % of the total solvents in the aqueous particle-free inkjet ink composition. In addition, the aqueous medium generally comprises at least 80 weight % or at least 90 weight % but less than 97 weight % of the total weight of the aqueous particle-free inkjet ink composition. In most embodiments, the aqueous medium is 100% water.

While not essential to the practice of this invention, the aqueous particle-free inkjet ink compositions can also include one or more optional additives that can enhance formulation, ink jetting properties, shelf life before printing, or glossiness of the ink jet printed image. Such materials can include but are not limited to, to acids or bases to adjust the pH, biocides, surfactants to adjust the static surface tension or dynamic surface tension of the aqueous ink jet ink compositions, defoaming agents, pH buffers, corrosion inhibitors, viscosity modifiers, wetting agents, chelating agents, antifungal agents, jetting aids, filament length modifiers, thickeners, drying agents, flocculating agents, waterfastness agents, dye solubilizers, light stabilizers, anti-curl agents, and other components that would be known to one skilled in the art, all of which components can be present in small amounts that would be known in the art for optimal performance. Examples of such materials are known in the art.

However, the aqueous particle-free inkjet ink compositions used in the present invention do not contain appreciable or effective amounts of "humectants" that are typically used in inkjet ink compositions and generally comprise at least one hydroxyl group per molecule. Such compounds are generally completely absent or present in an amount of less than 0.1 weight %, based on the total weight of the aqueous particle-free inkjet ink composition. Representative humectants are described, for example, in [0074]-[0082] of U.S. Patent Application Publication 2014/0231674 (noted above).

The aqueous particle-free inkjet ink compositions for the present invention can be prepared simply by mixing the essential (A) and (B) components in the (C) aqueous medium with suitable mixing, in any desired order, at suitable temperature and in proportions to achieve the desired concentrations. Optional additives described above can also be included during the formulation process if desired. Typically, the mixing can be carried out at room temperature with moderate stirring. Filtering can be used to remove any solids or particulates. The formulated aqueous particle-free inkjet ink compositions can be used immediately upon mixing or stored or shipped for later use by various customers.

Ink Sets

The aqueous particle-free ink jet ink compositions for use in this invention can be provided as part of an ink set. Such ink sets can therefore include multiple aqueous inkjet ink compositions of the same or different colors.

Each aqueous inkjet ink composition in the ink set (other than the aqueous particle-free inkjet ink composition described for the invention) can be formulated in any particular fashion using any desirable component and need not be particle-free. The aqueous inkjet ink compositions that contain particles can include one or more pigment colorants.

For example, a useful ink set can include for example, multiple aqueous color ink jet ink compositions chosen from an aqueous cyan ink jet ink composition, an aqueous magenta ink jet ink composition, an aqueous yellow ink jet ink composition, and an aqueous particle-free black ink jet ink composition according to the present invention.

Methods of Ink Jet Printing

The present invention can be practiced by inkjet printing and forming at least one colored image on a suitable substrate (or receiver element, described below). This is generally accomplished by incorporating one or more aqueous particle-free inkjet ink compositions described herein into a suitable ink jet printing apparatus containing a main fluid supply and ink jetting droplets of each of the one or more aqueous particle-free inkjet ink compositions to be ejected in an imagewise pattern onto the receiver element. In some inkjet systems, the main fluid supply is a recirculating main fluid supply containing the aqueous particle-free inkjet ink composition according to the present invention.

For example, an inkjet printed image can be provided by inkjet printing one or more of the aqueous particle-free inkjet ink compositions using thermal or piezoelectric drop-on-demand (DOD) printheads or continuous (CIJ) printheads, each printhead being incorporated into DOD or continuous inkjet printing apparatus, respectively, containing a main fluid supply, for example a recirculating main fluid supply, containing the aqueous particle-free inkjet ink composition. Each type of printhead and apparatus attached thereto requires specific properties in the aqueous particle-free ink jet ink compositions in order to achieve reliable and accurate jetting of each composition.

For example, the method for inkjet printing can comprise:
providing a suitable receiver element,
providing a main fluid supply (such as a recirculating main fluid supply) of an aqueous particle-free inkjet ink composition according to the present invention, and
pumping the aqueous particle-free inkjet ink composition from the main fluid supply (such as a recirculating main fluid supply) to a drop generator mechanism, and
ejecting a continuous stream of the aqueous particle-free inkjet ink composition from the drop generator mechanism, which continuous stream from the main fluid supply (such as a recirculating main fluid supply) is broken into printing ink drops and non-printing ink drops to provide a waterfast inkjet printed image on the receiver element.

In some embodiments, such method also includes, the printed ink is controlled in response to electrical signals received from a control mechanism, to differentiate between printing ink drops and non-printing ink drops, and the non-printing ink drops are collected and returned to a recirculating main fluid supply.

For example, in many embodiments, the aqueous particle-free inkjet ink composition described herein has a dedicated delivery channel to avoid having oppositely charged materials in the multiple aqueous inkjet ink compositions interact until they come into reactive association to form a composite color image on a receiver element. The multiple aqueous inkjet ink compositions can be applied (ink jetted) either in the same pass or in different passes through an ink jet printer such as the CIJ apparatus described herein.

When the method is carried out using CIJ apparatus and processes, the method can include:
ink jetting the aqueous particle-free inkjet ink compositions described herein as a continuous stream from a recirculating main fluid supply, breaking the continuous stream into both spaced ink drops and non-printing ink drops; and
collecting and returning the non-printing ink drops to the recirculating main fluid supply.

For all of the ink jetting operations and particularly for ink jetting the aqueous particle-free inkjet ink composition using CIJ methods and equipment, ink jetting can be carried out at a suitable firing frequency of at least 350 kHz with a near nozzle velocity of at least 15 msec.

The aqueous particle-free inkjet ink composition used in the practice of this invention can be positioned in any one of the printhead ports intended for use in an ink jet printing apparatus. The printhead containing the aqueous particle-free ink jet ink composition can be positioned on the same carriage assembly as another aqueous ink jet ink composition, or they can be positioned on separate carriage assemblies.

The method of the present invention can be carried out to provide a suitable colored inkjet printed image on a suitable receiver element. For example, suitable receiver elements can include but are not limited to, photoglossy receivers or plain paper receivers such as bright white inkjet papers that are commercially available from a number of commercial sources (as described for example, in Col. 13, lines 28-34) of U.S. Pat. No. 8,187,371 (Brust et al.). The photoglossy receivers (also known as swellable media or microporous media) can be manufactured with a coated layer on an underlying paper support and are also useful for providing photographic quality ink jet printed images. Some details of such substrates are provided in Col. 13 (lines 37-51) of U.S. Pat. No. 8,187,371 (noted above). Plain papers can be treated with multivalent salts or cationic polymers during or after manufacture as is well known in the art. Other useful receiver elements are described in U.S. Pat. No. 6,045,917 (Missell et al.), U.S. Pat. No. 5,605,750 (Romano et al.), U.S. Pat. No. 5,723,211 (Romano et al.), and U.S. Pat. No. 5,789,070 (Shaw-Klein et al.).

Useful paper receiver elements include plain bond papers, surface-treated papers, coated or calendared business gloss papers, resin-coated papers, laminated substrates comprising both paper layers and polymeric film layers such as polyester film layers, lottery ticket stock, and heavy stock papers. It is also possible to use fabrics, cardboard, plastic films (such as polyester films), microporous materials, and any other material known in the art. Thus, the receiver element can be transparent, translucent, or opaque.

The durability and other properties of ink jet printed images provided according to this invention can be improved by using receiver elements that have been pretreated with a composition to enhance the quality of the ink jet printed images. This pretreatment is typically done prior to incorporation of the receiver element into the inkjet printing apparatus (such as a continuous ink jet printing apparatus), but in some instances, the receiver element can be pretreated within the apparatus before application of an aqueous particle-free inkjet ink composition. One or both sides of a receiver element can be pretreated, or one side can be pretreated and the opposite surface left untreated.

Such pretreatment compositions can also comprise a cationic polyelectrolyte comprising amidine moieties, and the details of such compounds and their useful amounts are provided in U.S. Pat. No. 8,562,126 (Xiang et al.), the disclosure of which is incorporated herein by reference. Other cationic polymers, such as a poly(dialkyldimethylammonium chloride) can also be used.

As noted from the data provided in the Examples below, the improvement in print optical density can vary with the type of substrate used and the amount and composition of water-soluble polymer used in the aqueous particle-free inkjet ink composition.

A resulting printed receiver element can be any suitable article, and includes but is not limited to, documents, paper currency, postage stamps, various packaging materials, fabrics, polymeric films or sheets, label for clothing, perfume and wine bottles labels, gaming articles, passports, drivers licenses, and other articles that would be readily apparent to one skilled in the art using the teaching provided herein.

It is also practical that the spaced ink drops of the aqueous particle-free ink jet ink compositions are dried on the receiver element after they have been ink jetted.

Some embodiments of the aqueous particle-free inkjet ink compositions are designed specifically for use in a continuous ink jet printer, in which a recirculating main fluid supply is provided with a desired amount of the aqueous particle-free ink jet ink composition, which is then pumped from the recirculating main fluid supply to a drop generator mechanism such as one or more ink jet print heads, where a continuous stream of the aqueous particle-free inkjet ink composition is ejected from the drop generator mechanism, which continuous stream then is broken into spaced ink drops and non-printing ink drops.

Some details of CIJ printing operations and apparatus are described more fully for example in U.S. Pat. No. 4,734,711 (Piatt et al.), U.S. Pat. No. 5,394,177 (McCann et al.), U.S. Pat. No. 6,588,888 (noted above), U.S. Pat. No. 6,943,037 (noted above), U.S. Pat. No. 4,614,948 (Katerberg et al.), and U.S. Pat. No. 4,971,527 (Dick), the disclosures of which are incorporated by reference herein. In contrast to drop-on-demand printing, CIJ is a very high speed printing process and it is designed to operate at substrate transport speeds in excess of 200 m/min.

A useful sub-system common to most CIJ apparatus and methods and to some of the more recent DOD printing systems, is a recirculating fluid system with a recirculating main fluid supply, which constantly recirculates the aqueous particle-free ink jet ink composition.

In some embodiments of the present invention, the aqueous particle-free inkjet printer ink composition is printed by employing a plurality of drop volumes (or drop sizes) formed from the continuous fluid stream, with non-printing ink drops of a different volume than printing drops being diverted by a drop deflection means into a gutter for recirculation, as disclosed for example in U.S. Pat. No. 6,588,888 (noted above), U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,517,197 (Hawkins et al.), U.S. Pat. No. 6,866,370 (Jeanmaire), and U.S. Pat. No. 6,575,566 (Jeanmaire et al.), U.S. Patent Application Publication 2003/0202054 (Jeanmaire et al.) the disclosures of all of which are incorporated herein by reference.

In other embodiments, the aqueous particle-free inkjet ink composition is printed onto at a suitable receiver element using an apparatus capable of controlling the direction of the formed printing ink drops and non-printing ink drops by asymmetric application of heat to the continuous stream of the aqueous particle-free inkjet ink composition that initializes drop break-up and serves to steer the resultant drops, as disclosed for example in U.S. Pat. No. 6,079,821 (Chwalek et al.) and U.S. Pat. No. 6,505,921 (Chwalek et al.), the disclosures of both of which are herein incorporated by reference. Useful agitation of the aqueous particle-free inkjet ink composition, heated recirculating main fluid supply, and ink jet print head and composition filtration means for CIJ ink compositions are described for example in U.S. Pat. No. 6,817,705 (Crockett et al.), the disclosure of which is incorporated herein by reference. Printer replenishing systems for maintaining quality of the aqueous particle-free ink jet ink composition and to counter the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

It can be useful to regularly replenish the recirculating main fluid supply with additional amounts of each aqueous particle-free inkjet ink composition described herein to keep the reservoir at the desired level during ink jet printing. Alternatively, water can be added to the recirculating main fluid supply to compensate for evaporation during inkjet printing. A skilled worker in the art would understand how to accomplish these operations using the teaching provided in the art noted above.

The following Examples are provided to illustrate the practice of this invention and are not meant to be limiting in any manner.

The specific water-soluble polymers used in the following Examples are described above along with acid numbers and molecular weights for the specific materials prepared or purchased for use in the present invention.

Aqueous particle-free inkjet ink compositions ("inks") were prepared according to the present invention to contain the following components (while excluding conventional humectants) wherein all amounts are based on the total composition weight:

Water 50.03 weight %
Triethanolamine 0.5 weight %
Proxel™ GXL biocide 0.1 weight %
Kordek™ MLX biocide 0.2 weight %
Cobratec TT50S
corrosion inhibitor 0.1 weight %
Surfynol® 440 surfactant 0.08 weight %
Surfynol® DF-110L defoamer 0.1 weight %
Sulfuric acid (1 normal) 2.70 weight %
Direct Black 168 dye 2.02 weight %
(27% dye solids)
Direct Black 19 dye 34.17 weight %
(17% dye solids)
Polymer 9 1.25-3.75 weight % (in 25% water solution)

Each aqueous particle-free inkjet ink composition was formulated by mixing all listed components together, and had a pH of between 8 and 9 and viscosity of 2-2.5 centipoise.

Comparative Example 1

A comparative aqueous particle-free inkjet ink composition ("ink") was formulated using the formulation described above except that water-soluble polymers were omitted (polymer weight was replaced with water). The resulting "ink" had a similar pH and viscosity as described above.

Inventive Examples 1-5

The Comparative Example 1 "ink" (0 weight % water-soluble polymers) and various aqueous particle-free inkjet ink compositions ("inks") prepared using the formulation described above (using 1.25 weight %, 1.875 weight %, 2.5 weight %, 3.125 weight %, and 3.75 weight % of Polymer 9) were used to provide black images on 25# TrueJet paper substrate (available from Verso Paper Company). A drop of each "ink" was deposited upon a sample of the paper substrate, and spread on the surface of the substrate sample using a #4 wire wound rod to provide a generally uniform ink coating, and then dried with heated air. The print optical density of each resulting black image was determined using an X-Rite eXact® reflectance spectrophotometer in the Status T mode. The results of these measurements for the various black images are shown in the following TABLE I.

TABLE I

| Ink Example | Weight % Polymer 9 | Print Optical Density |
| --- | --- | --- |
| Comparative 1 | 0 | 1.49 |
| Inventive 1 | 1.250 | 1.52 |
| Inventive 2 | 1.875 | 1.60 |
| Inventive 3 | 2.500 | 1.73 |
| Inventive 4 | 3.125 | 1.76 |
| Inventive 5 | 3.750 | 1.82 |

These data show that the addition of Polymer 9 according to the present invention provided improved print optical density especially compared to the ink from which the water-soluble polymer was absent. The improvement increased as the amount of the Polymer 9 was increased. In those embodiments in which the amount of Polymer 9 was at least 2.500 weight %, the print optical density of the black image was at greater than 10% greater than the print optical density for the black image obtained when Polymer 9 was absent. The point at which the print optical density improvement would be at least 10% is likely between 1.875% and 2.500% water-soluble polymer for the particular substrate used in these experiments.

Inventive Examples 6-13

Aqueous particle-free inkjet ink compositions were prepared using the formulation described above for Inventive Examples 1-5 and several water-soluble polymers according to the present invention. A drop of each "ink" was applied to samples of Verso 80# Sterling Ultra Gloss paper substrate and spread as described above in Inventive Examples 1-5, and print optical density values of the resulting black images were similarly determined and shown in the following TABLE II.

TABLE II

| Ink Example | Water-soluble Polymer | Weight % of Water-soluble Polymer | Print Optical Density* |
| --- | --- | --- | --- |
| Comparative 1 | None | 0 | 1.28 |
| Inventive 1 | 9 | 2.50 | 1.49 |
| Inventive 7 | 1 | 1.70 | 1.44 |
| Inventive 8 | 2 | 1.70 | 1.38 |
| Inventive 9 | 3 | 2.50 | 1.43 |
| Inventive 10 | 4 | 2.50 | 1.49 |
| Inventive 11 | 5 | 1.88 | 1.34 |
| Inventive 12 | 6 | 2.50 | 1.41 |
| Inventive 13 | 7 | 2.00 | 1.47 |
| Inventive 14 | 8 | 1.88 | 1.55 |

*Values normalized to equal water-soluble polymer content

The data in TABLE II shows that several water-soluble polymers described according to the present invention are useful to provide improved print optical density compared to the Comparative Example 1 ink from which the water-soluble polymers were omitted. In most instances, the presence of the water-soluble polymer provided an improvement in print optical density of at least 10%, and in some instances, the improvement was at least 15%, and even at least 20% for one inventive "ink".

Inventive Examples 14-33

Water-soluble Polymer 9 was incorporated into several aqueous-particle-free inkjet ink compositions at various % solids according to the present invention using the formulation described above in Inventive Examples 1-5. Samples of each "ink" were inkjet printed onto samples of each of four paper substrates identified in TABLE III below using a laboratory model "continuous" inkjet printer in Ohio Print Mode, 600×600 dpi, 400 kHz frequency, and 1000 feet/minute printing speed.

The print optical density values for each printed black image was determined using an X-Rite eXact® reflectance spectrophotometer in the Status T mode and the results are shown below in TABLE III.

TABLE III

| Ink Example | Weight % of Polymer 9 | Paper Substrate | Print Optical Density |
|---|---|---|---|
| Comparative 1 | 0 | Verso 80# Sterling Ultra Gloss paper | 1.128 |
| Inventive 14 | 2.500 | Verso 80# Sterling Ultra Gloss paper | 1.344 |
| Inventive 15 | 1.250 | Verso 80# Sterling Ultra Gloss paper | 1.262 |
| Inventive 16 | 1.875 | Verso 80# Sterling Ultra Gloss paper | 1.276 |
| Inventive 17 | 3.125 | Verso 80# Sterling Ultra Gloss paper | 1.342 |
| Inventive 18 | 3.750 | Verso 80# Sterling Ultra Gloss paper | 1.404 |
| Comparative 1 | 0 | 25# TrueJet paper | 1.262 |
| Inventive 19 | 2.500 | 25# TrueJet paper | 1.516 |
| Inventive 20 | 1.250 | 25# TrueJet paper | 1.410 |
| Inventive 21 | 1.875 | 25# TrueJet paper | 1.458 |
| Inventive 22 | 3.125 | 25# TrueJet paper | 1.578 |
| Inventive 23 | 3.750 | 25# TrueJet paper | 1.626 |
| Comparative 1 | 0 | International Paper 24# Dataspeed ImageLok® paper | 1.012 |
| Inventive 24 | 2.500 | International Paper 24# Dataspeed ImageLok® paper | 1.178 |
| Inventive 25 | 1.250 | International Paper 24# Dataspeed ImageLok® paper | 1.156 |
| Inventive 26 | 1.875 | International Paper 24# Dataspeed ImageLok® paper | 1.172 |
| Inventive 27 | 3.125 | International Paper 24# Dataspeed ImageLok® paper | 1.170 |
| Inventive 28 | 3.750 | International Paper 24# Dataspeed ImageLok® paper | 1.190 |
| Comparative 1 | 0 | Appleton 24# Coated Utopia Book Inkjet paper | 1.108 |
| Inventive 29 | 2.500 | Appleton 24# Coated Utopia Book Inkjet paper | 1.338 |
| Inventive 30 | 1.250 | Appleton 24# Coated Utopia Book Inkjet paper | 1.264 |
| Inventive 31 | 1.875 | Appleton 24# Coated Utopia Book Inkjet paper | 1.274 |
| Inventive 32 | 3.125 | Appleton 24# Coated Utopia Book Inkjet paper | 1.332 |
| Inventive 33 | 3.750 | Appleton 24# Coated Utopia Book Inkjet paper | 1.390 |

The data in TABLE III show that the present invention can be used at varying amounts of water-soluble polymer in the aqueous particle-free inkjet ink compositions to provide improved print optical density for inkjet printed images on various types of commercial substrates.

The invention has been described in detail with particular reference to certain preferred embodiments thereof, but it will be understood that variations and modifications can be effected within the spirit and scope of the invention.

The invention claimed is:

1. A method of providing an ink jetted image, comprising:
ink jetting an aqueous particle-free inkjet ink composition onto a receiver element from a main fluid supply containing the aqueous particle-free inkjet ink composition,
wherein the aqueous particle-free inkjet ink composition consists essentially of:
(A) a water-soluble dye colorant present in an amount of at least 2 weight %, based on the total weight of the aqueous particle-free inkjet ink composition,
(B) a water-soluble polymer present in an amount of at least 1 weight %, based on the total weight of the aqueous particle-free inkjet ink composition, and
(C) an aqueous medium consisting essentially of water, and
wherein the water-soluble polymer has an acid number of at least 130 and a molecular weight of at least 5,000 and up to and including 20,000, and comprises: (a) at least 50 mol % and up to and including 85 mol % of recurring units derived from one or more ethylenically unsaturated polymerizable monomers selected from the group consisting of substituted or unsubstituted styrenes, (meth)acrylates, and combinations thereof, each (meth)acrylate comprising either a pendant phenyl group or an alkyl ester group having 10 to 20 carbon atoms; and (b) at least 15 mol % and up to and including 40 mol % of recurring units comprising a carboxylic acid group, all recurring unit amounts being based on the total recurring units in the water-soluble polymer.

2. The method of claim 1, wherein the water-soluble dye colorant is a Direct Black dye, an Acid Black dye, or a blend of two or more of such dyes.

3. The method of claim 1, wherein the water-soluble dye colorant is a blend of at least one Direct Black dye and at least one Acid Black dye.

4. The method of claim 1, wherein the water-soluble dye colorant is present in an amount of at least 2 weight % and up to and including 10 weight %, based on the total weight of the aqueous particle-free inkjet ink composition.

5. The method of claim 1, comprising:
ink jetting the aqueous particle-free inkjet ink composition onto the receiver element from a recirculating main fluid supply containing the aqueous particle-free inkjet ink composition.

6. The method of claim 1, comprising:
ink jetting the aqueous particle-free inkjet ink composition as a continuous stream from a recirculating main fluid supply and breaking the continuous stream into both printing ink drops and non-printing ink drops; and collecting and returning the non-printing drops to the recirculating main fluid supply.

7. The method of claim 1, carried out using a continuous inkjet printing apparatus comprising a recirculating main fluid supply containing the aqueous particle-free inkjet ink composition.

8. The method of claim 1, wherein at least 98 weight % of the aqueous medium consists of water.

9. The method of claim 1, wherein the water-soluble polymer has an acid number of at least 130 and up to and including 240 and a molecular weight of at least 5,000 and up to and including 15,000, and comprises: (a) at least 55 mol % and up to and including 80 mol % of recurring units derived from one or more ethylenically unsaturated polymerizable monomers selected from the group consisting of substituted or unsubstituted styrenes, (meth)acrylates, and combinations thereof, each (meth)acrylate comprising either a pendant phenyl group or an alkyl ester group having 12 to 18 carbon atoms; and (b) at least 20 mol % and up to and including 35 mol % of recurring units comprising a carboxylic acid group, all recurring unit amounts being based on the total recurring units in the water-soluble polymer.

10. The method of claim 1, wherein the water-soluble polymer comprises: (a) at least 55 mol % and up to and including 80 mol % of recurring units derived from one or more ethylenically unsaturated polymerizable monomers selected from benzyl (meth)acrylates, a substituted or unsubstituted styrene, and a combination thereof; and (b) at least 20 mol % and up to and including 35 mol % of recurring units derived from (meth)acrylic acid, all recurring unit amounts being based on the total recurring units in the water-soluble polymer.

11. The method of claim 1, wherein the water-soluble polymer is present in the aqueous particle-free inkjet ink composition in an amount of at least 1 weight % and up to and including 4 weight %, based on the total weight of the aqueous particle-free inkjet ink composition.

12. The method of claim 1, wherein the water-soluble polymer is present in the aqueous particle-free inkjet ink composition in an amount of at least 1.5 weight % and up to and including 3 weight %, based on the total weight of the aqueous particle-free inkjet ink composition.

13. The method of claim 1, comprising:
   ink jetting the aqueous particle free inkjet ink composition onto the receiver element to provide an ink jetted image that has a print optical density, as determined using a reflectance spectrophotometer in Status T mode, which is at least 10% greater than the print optical density of an ink jetted image provided and measured in the same manner on the receiver element using a comparative aqueous particle-free inkjet ink composition that is the same as the aqueous particle-free inkjet ink composition, but from which the water-soluble polymer has been omitted.

* * * * *